(12) United States Patent
Assion

(10) Patent No.: US 9,498,741 B2
(45) Date of Patent: Nov. 22, 2016

(54) FILTER ASSEMBLY

(76) Inventor: Norbert M. Assion, Winstead, CT (US)

(*) Notice: Subject to any disclaimer, the term of this patent is extended or adjusted under 35 U.S.C. 154(b) by 1915 days.

(21) Appl. No.: 12/586,042

(22) Filed: Sep. 15, 2009

(65) Prior Publication Data

US 2010/0065486 A1 Mar. 18, 2010

Related U.S. Application Data

(60) Provisional application No. 61/192,660, filed on Sep. 18, 2008.

(51) Int. Cl.
| | |
|---|---|
| *B01D 29/58* | (2006.01) |
| *B01D 27/00* | (2006.01) |
| *B01D 27/14* | (2006.01) |
| *B29C 65/08* | (2006.01) |
| *B01D 29/01* | (2006.01) |
| *B29C 65/56* | (2006.01) |
| *B29C 65/00* | (2006.01) |
| *B29L 31/14* | (2006.01) |
| *B29C 65/48* | (2006.01) |

(52) U.S. Cl.
CPC ............ *B01D 29/012* (2013.01); *B29C 65/08* (2013.01); *B29C 65/561* (2013.01); *B29C 65/562* (2013.01); *B29C 66/30223* (2013.01); *B29C 66/5344* (2013.01); *B29C 66/53421* (2013.01); *B29C 66/7392* (2013.01); *B01D 2201/291* (2013.01); *B29C 65/48* (2013.01); *B29C 65/483* (2013.01); *B29C 66/73921* (2013.01); *B29L 2031/14* (2013.01)

(58) Field of Classification Search
CPC .......... B01D 29/012; B01D 2201/291; B01D 24/007; B01D 29/56; B01D 29/58; B01D 46/0023; B01D 46/0024; B01D 46/0026; B29C 65/08; B29C 65/561; B29C 65/562; B29C 66/30223; B29C 66/5344; B29C 66/7392; B29C 66/53421; B29C 65/483; B29L 2031/14
USPC .............................. 210/232, 261, 252, 323.2
See application file for complete search history.

(56) References Cited

U.S. PATENT DOCUMENTS

| | | | |
|---|---|---|---|
| 3,021,955 A | 2/1962 | Joyce | |
| 3,935,110 A | 1/1976 | Schmid et al. | |
| 4,011,961 A | 3/1977 | Widen et al. | 215/232 |
| 5,643,467 A * | 7/1997 | Romanco | 210/767 |

(Continued)

FOREIGN PATENT DOCUMENTS

| | | |
|---|---|---|
| EP | 0 487 831 A1 | 6/1992 |
| WO | WO-02/32543 A1 | 4/2002 |

OTHER PUBLICATIONS

"Filtration Applications", Allied Group, Inc. http://alliedfilters.com/filter_applications.htm (2009), 1 page.

Primary Examiner — Bobby Ramdhanie
Assistant Examiner — Denise R Anderson
(74) Attorney, Agent, or Firm — Harrington & Smith

(57) ABSTRACT

An assembly including a first filter element; and a filter element assembly connected to the first filter element. The filter element assembly includes a second filter element located between a first plate and a second plate. The second plate includes a liquid outlet into a center open area of the first filter element. The first and second plates are directly fixedly connected to each other to retain the second filter element therebetween. The second plate is located at an end of the first filter element.

22 Claims, 16 Drawing Sheets

(56) References Cited

U.S. PATENT DOCUMENTS

| | | | |
|---|---|---|---|
| 5,667,678 A * | 9/1997 | Dye et al. | 210/232 |
| 5,792,434 A * | 8/1998 | Ferlings | B01D 29/01 |
| | | | 210/330 |
| 5,807,415 A * | 9/1998 | Leo | 55/385.3 |
| 6,605,215 B2 | 8/2003 | Assion | 210/253 |
| 7,048,848 B2 | 5/2006 | Assion | 210/117 |
| 2002/0125178 A1 | 9/2002 | Smith et al. | 210/90 |
| 2004/0245179 A1 * | 12/2004 | Elsegood | 210/695 |
| 2006/0006109 A1 * | 1/2006 | Klein | B01D 29/01 |
| | | | 210/299 |
| 2006/0037906 A1 | 2/2006 | Assion | 210/323.1 |
| 2008/0169227 A1 | 7/2008 | Assion | 210/130 |

\* cited by examiner

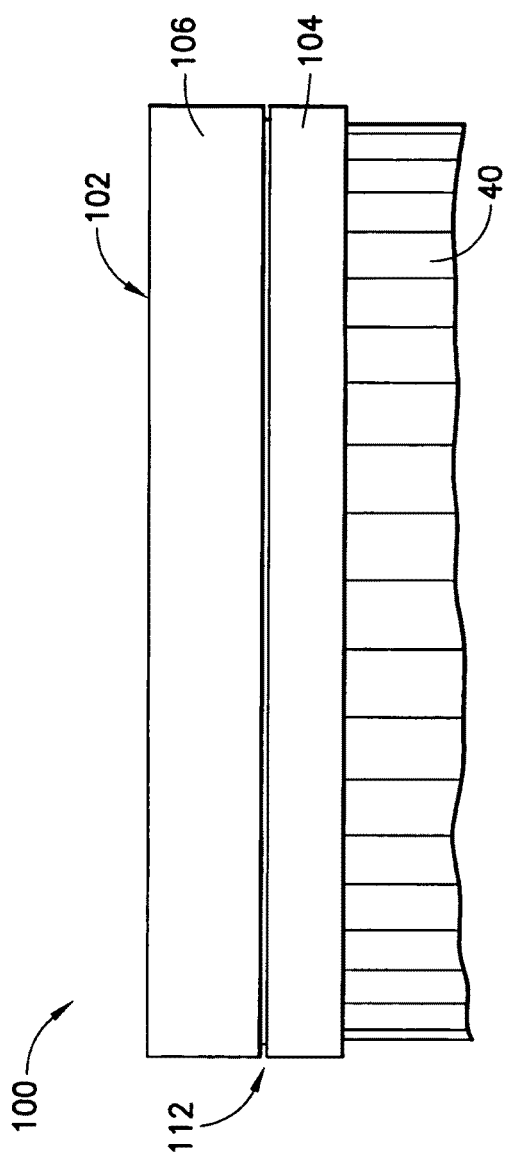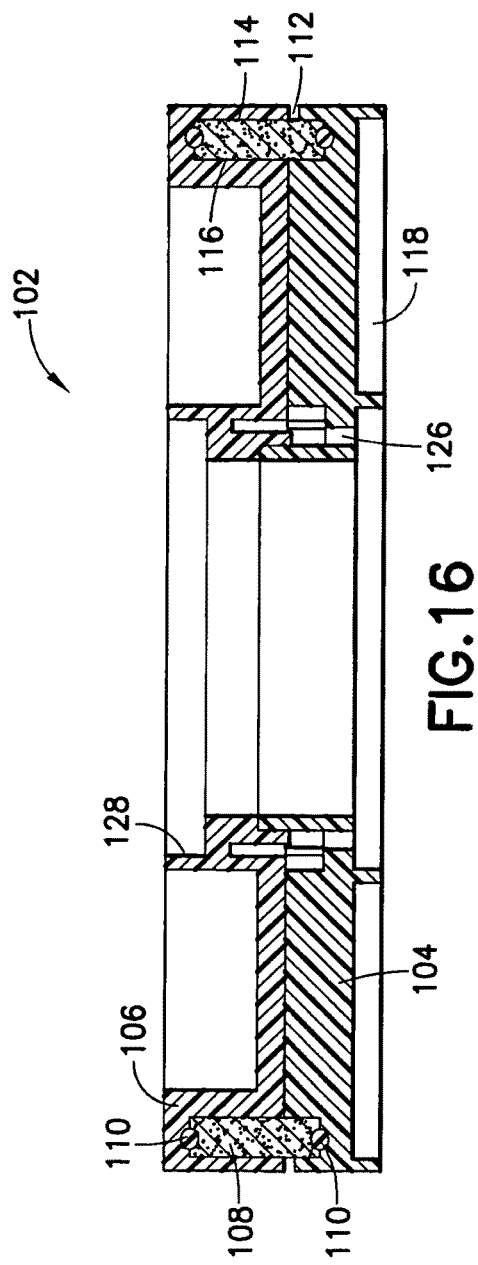

FILTER ASSEMBLY

CROSS REFERENCE TO RELATED APPLICATION

This application claims priority under 35 U.S.C. 119(e) to U.S. Provisional Patent Application No. 61/192,660 filed Sep. 18, 2008 which is hereby incorporated by reference in its entirety.

BACKGROUND OF THE INVENTION

Field of the Invention

This invention relates generally to filtration systems and methods and, more particularly, to a filter assembly intended to remove impurities from a liquid, such as a lubricant for example.

Brief Description of Prior Developments

U.S. Pat. Nos. 6,605,215 and 7,048,848, which are hereby incorporated by reference in their entireties, disclose different types of filter assemblies.

SUMMARY

The following summary is merely intended to be exemplary. The summary is not intended to limit the scope of the claimed invention.

In accordance with one aspect of the invention, an assembly is provided including a first filter element; and a filter element assembly connected to the first filter element. The filter element assembly includes a second filter element located between a first plate and a second plate. The second plate includes a liquid outlet into a center open area of the first filter element. The first and second plates are directly fixedly connected to each other to retain the second filter element therebetween. The second plate is located at an end of the first filter element.

In accordance with another aspect of the invention, an assembly is provided comprising a filter element having a center hole and a frame. The frame comprises first and second frame members directly fixedly connected to each other with the filter element therebetween. The second frame member has a liquid outlet. The first and second frame members have center holes aligned with the center hole of the filter element. The assembly is sized and shaped to be located against an end of a different first filter element to substantially seal the end of the first filter element. The center holes are sized, shaped and located to receive a post of a mounting assembly therethrough to removably mount to the post.

In accordance with another aspect of the invention, a method is provided comprising locating a filter element between two frame members, wherein the filter element is a substantially solid disk made of a porous polymer material having a pore side of about 5 microns or less; and fixedly connecting the two frame members directly to each other to capture the filter element therebetween, wherein a second one of the frame members is sized and shaped to be connected to an end of a different first filter element.

BRIEF DESCRIPTION OF THE DRAWINGS

The foregoing aspects and other features of the invention are explained in the following description, taken in connection with the accompanying drawings, wherein:

FIG. 13 is an elevational side view of a top of a cartridge filter of another embodiment of the invention;

FIG. 16 is a cross sectional view of the assembly shown in FIG. 15 taken along line 16-16;

DETAILED DESCRIPTION OF EMBODIMENTS

U.S. Patent Application Publication Nos. US-2006-0037906-A1 and US-2008-0169227-A1 are hereby incorporated by reference in their entireties.

Figure 1:
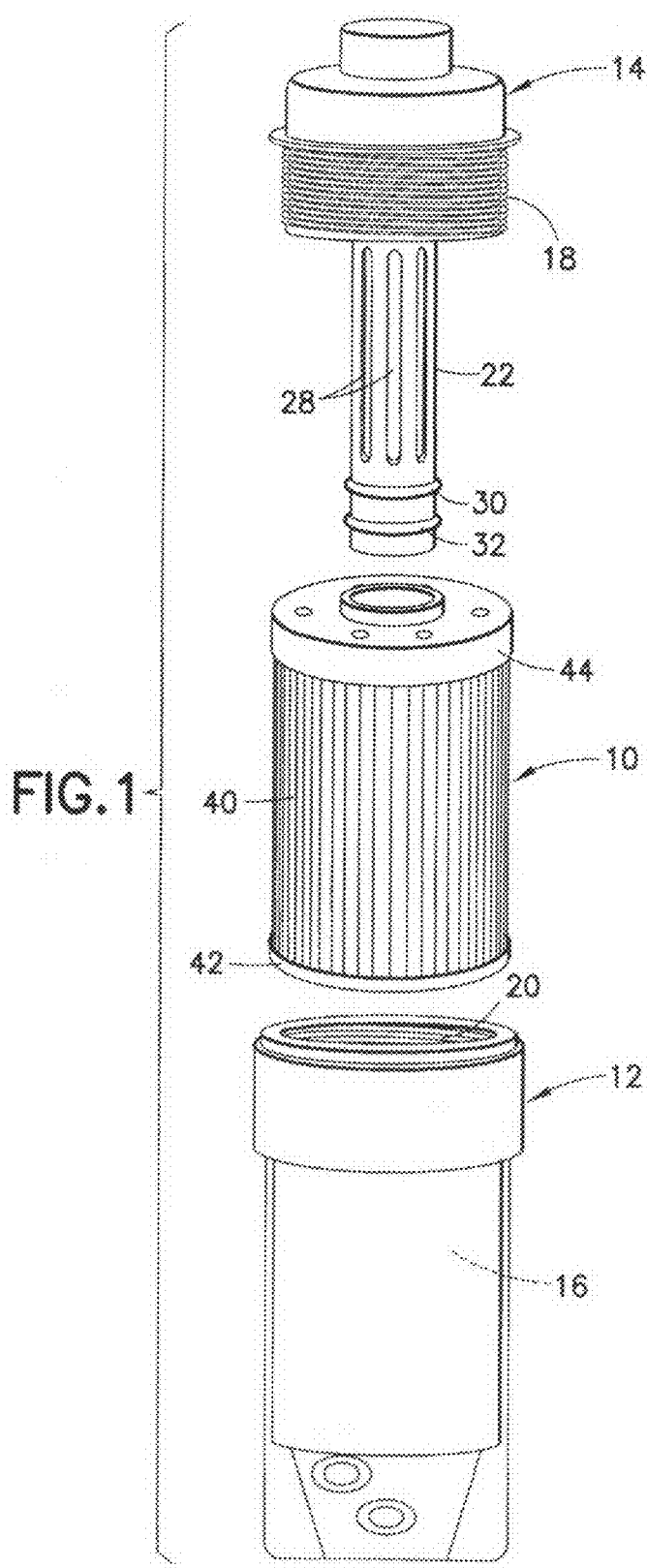
FIG. 1 is an exploded perspective view of an oil filter cartridge and mounting assembly for a vehicle.

Referring to FIG. 1, there is shown an exploded perspective view of a filter assembly 10 incorporating features of the invention and the components 12, 14 of an engine used to house the filter assembly 10. Although the invention will be described with reference to the example embodiments shown in the drawings, it should be understood that the invention can be embodied in many alternate forms of embodiments. In addition, any suitable size, shape or type of elements or materials could be used.

In this embodiment the filter assembly 10 is a cartridge. Unlike most of the filter assemblies described in the above-identified patents and patent publications, the cartridge 10 is intended to be removably connected to the engine by the components 12, 14. Without the need for a spin-on metal plate and an exterior metal housing (as with a conventional spin-on filter assembly), the cartridge 10 can be less expensive to manufacture than a conventional spin-on filter assembly.

Figure 2:
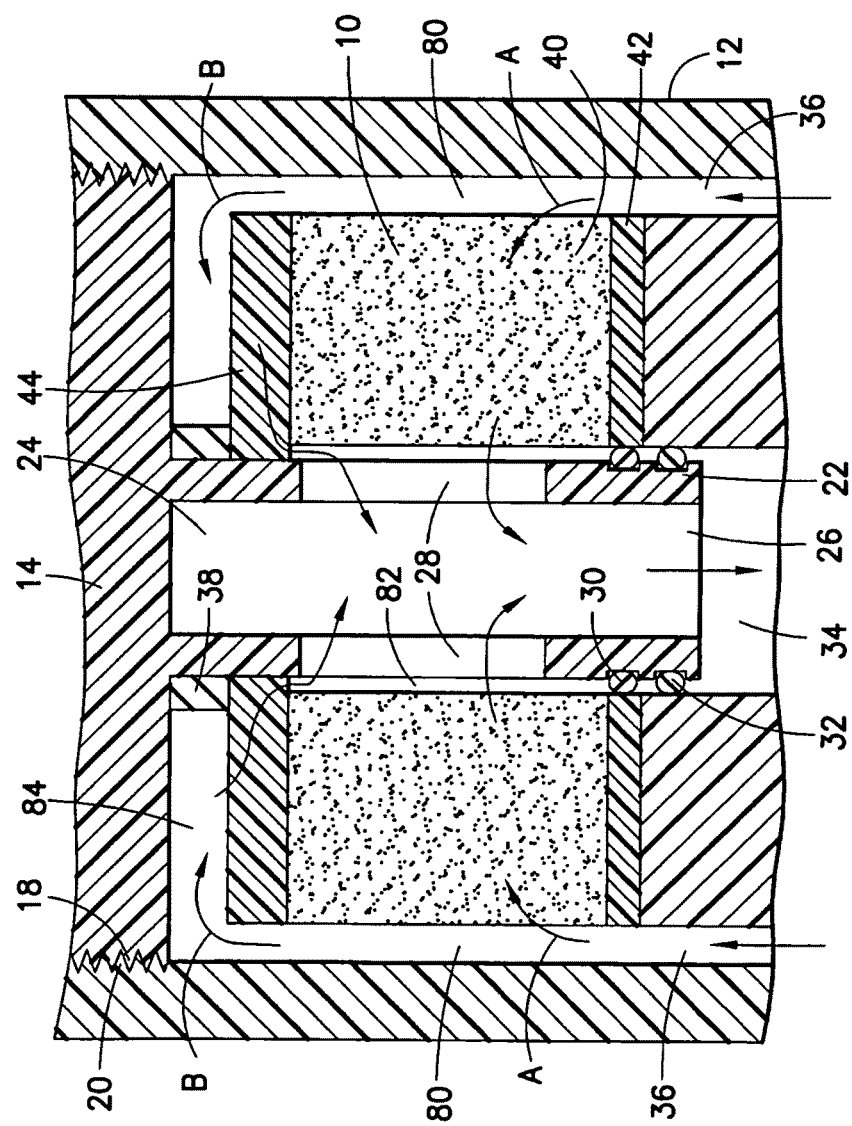
FIG. 2 is a partial cross sectional view of the elements shown in FIG. 1.
Figure 3:
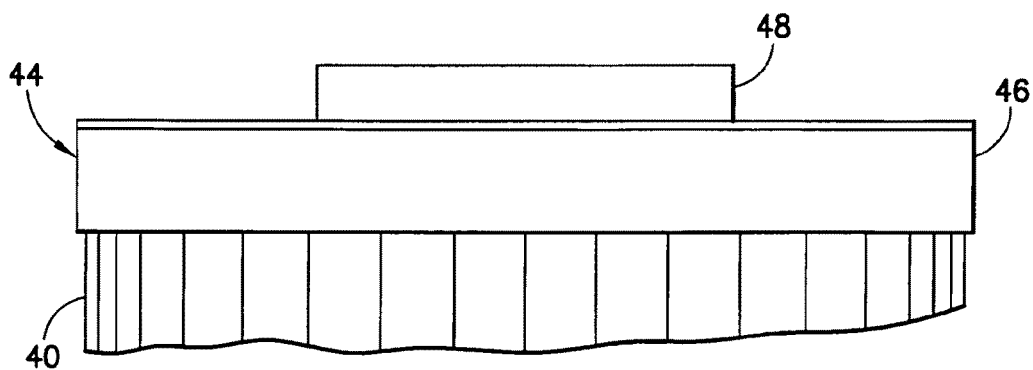
FIG. 3 is an elevational side view of the top of the cartridge shown in FIGS. 1-2.
Figure 4:
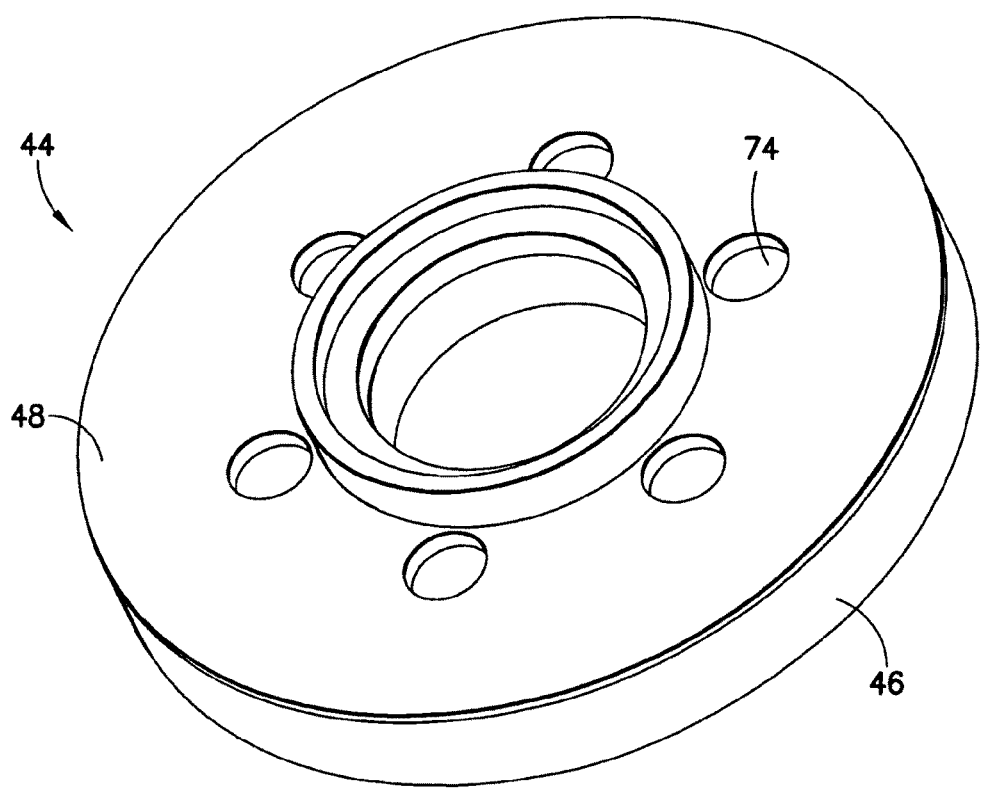
FIG. 4 is a perspective view of the top filter assembly shown in FIG. 3.
Figure 5:
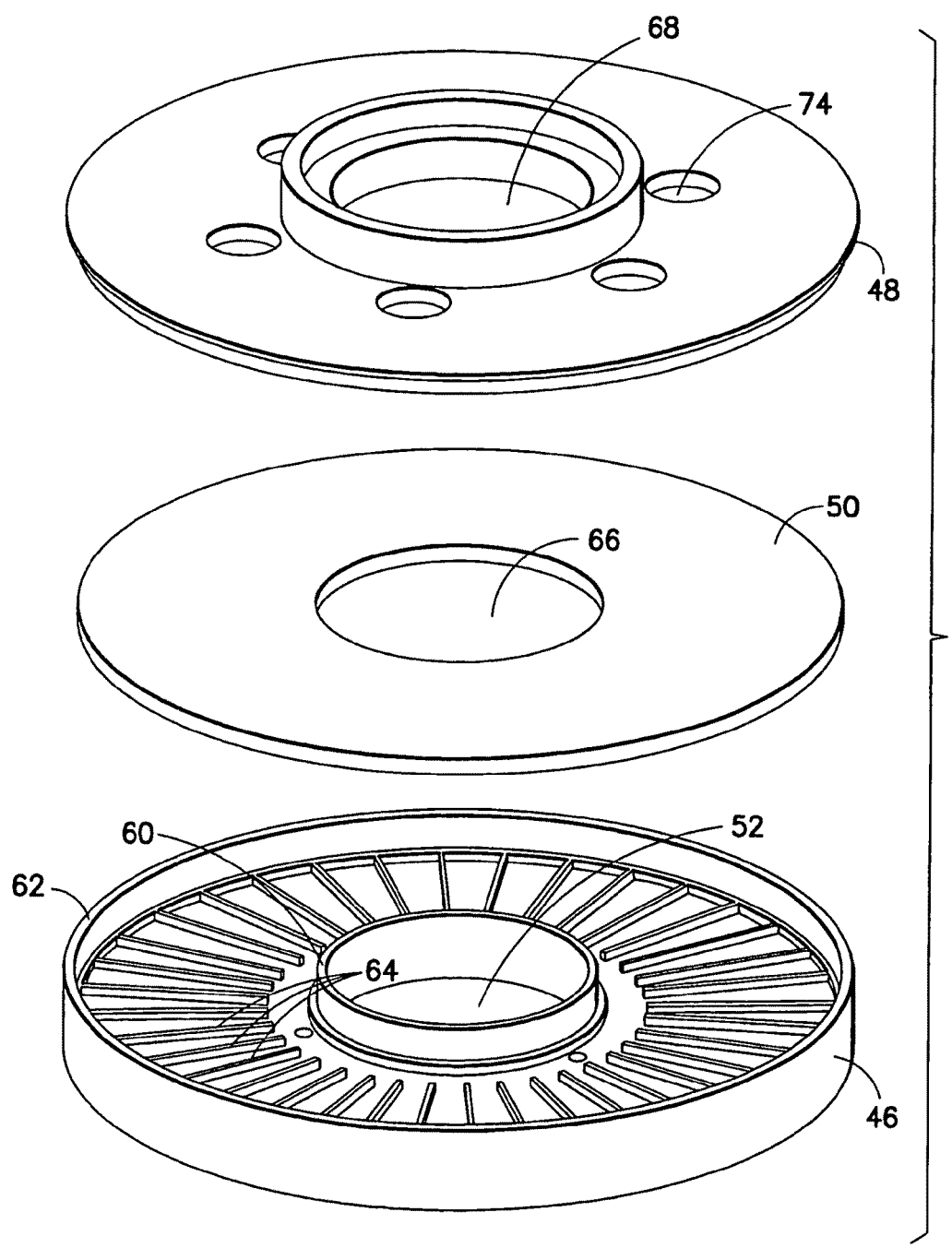
FIG. 5 is an exploded view of the assembly shown in FIG. 4.
Figure 6:
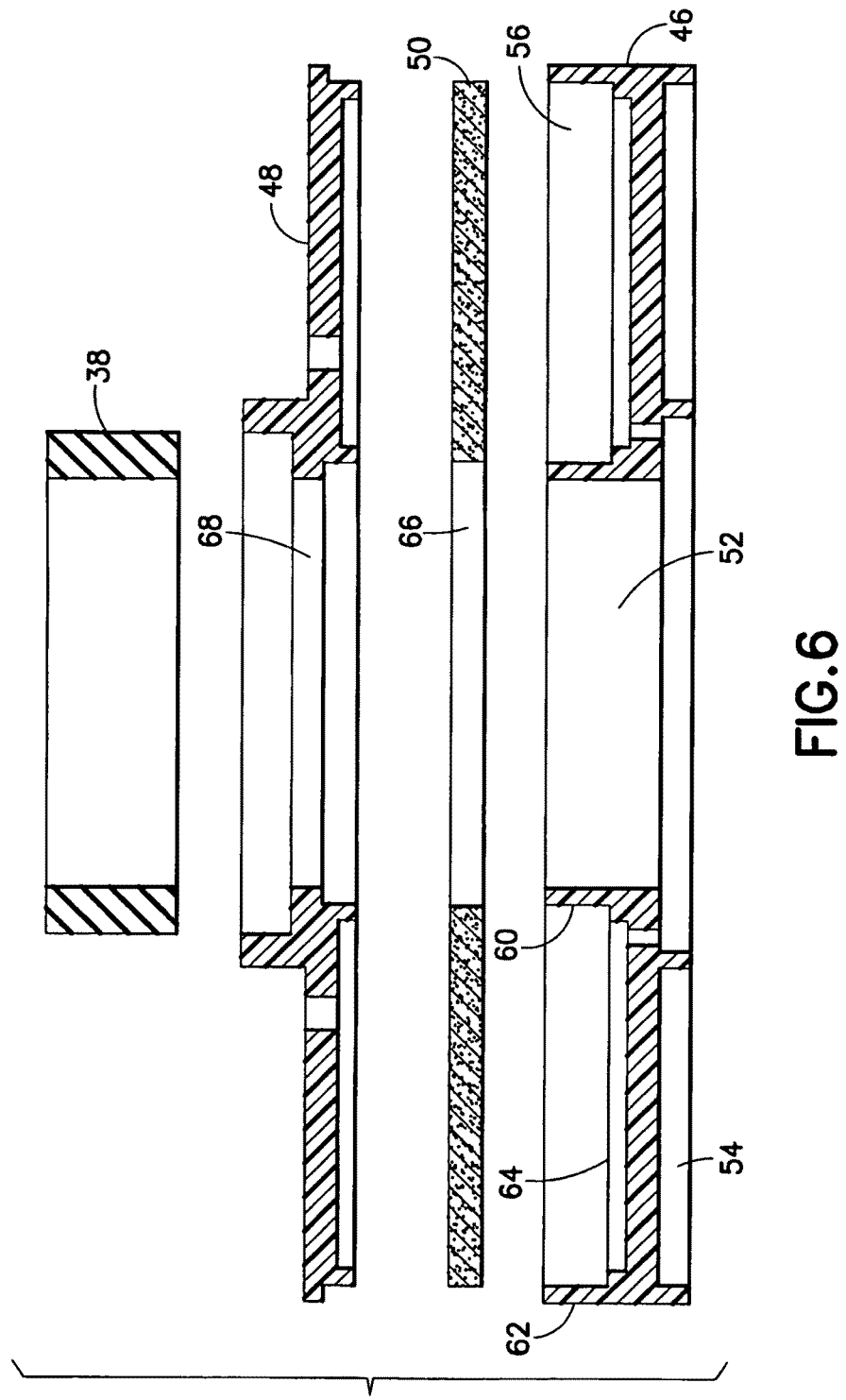
FIG. 6 is an exploded cross sectional view of the assembly shown in FIGS. 3-5 with a sealing ring.
Figure 8:
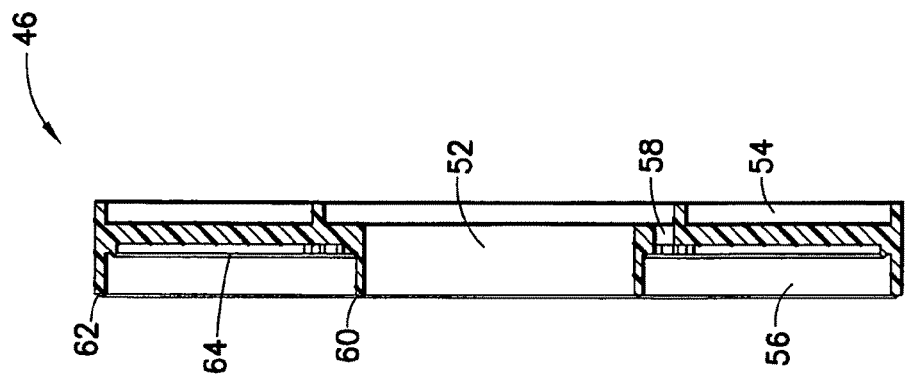
FIG. 8 is a cross sectional view of the bottom plate shown in FIG. 7 taken along line 8-8.
Figure 7:
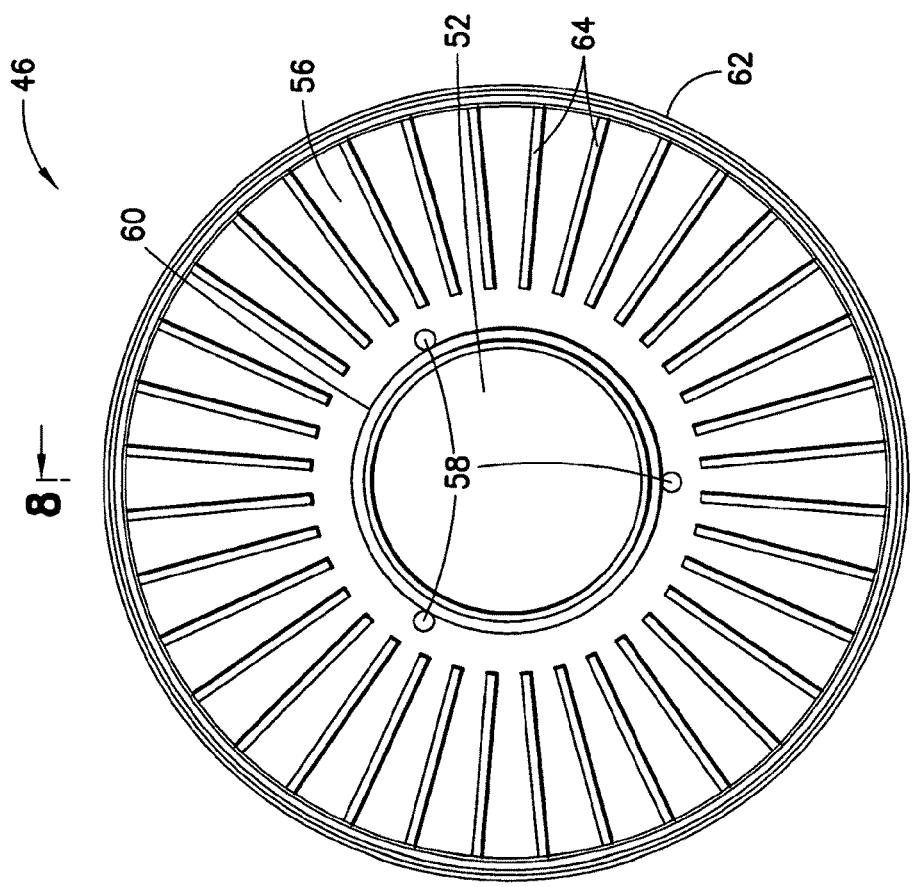
FIG. 7 is a plan top view of the bottom plate shown in FIG. 5-6.
Figure 10:
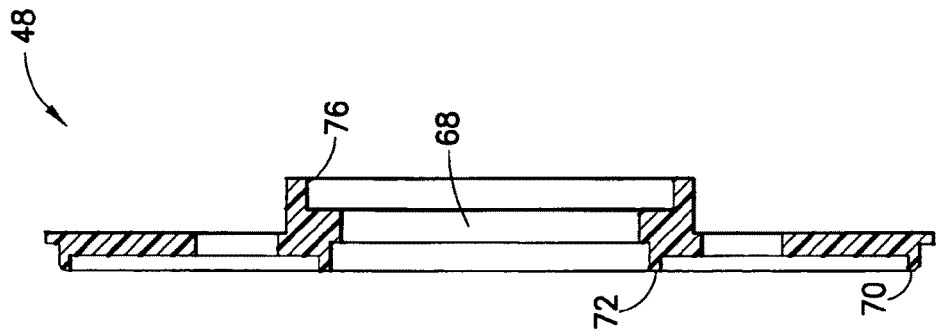
FIG. 10 is a cross sectional view of the top plate shown in FIG. 9 taken along line 10-10.
Figure 9:
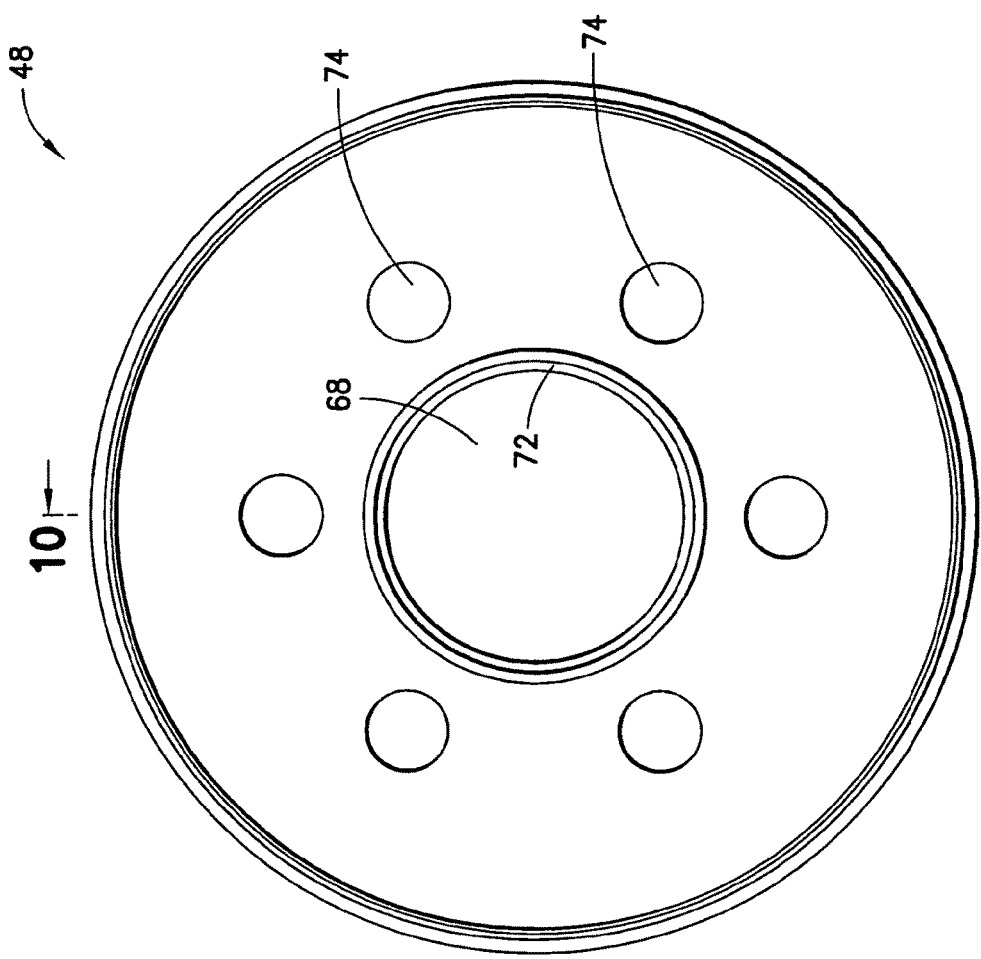
FIG. 9 is a plan top view of the top plate shown in FIG. 5-6.

The engine is an automobile internal combustion engine, and the cartridge 10 is used to filter engine oil. However, in an alternate embodiment the cartridge could be used for filtering a different type of filter (such as transmission fluid for example) and/or for use in a device other than an internal combustion engine. Referring also to FIG. 2, in the embodiment shown the first component 12 of the engine forms a cartridge receiving area 16. The second component 14 forms a cap for the receiving area 16. The second component 14 has threads 18 which are screwed into threads 20 in the receiving area 16 to removably attach the second component 14 to the first component 12. The second component 14 also has a center post 22. The post 22 functions as part of a mounting assembly for the cartridge 10. The post 22 has a center channel 24 with a bottom outlet 26 and side inlet slots 28. The bottom end of the post 22 also has two O-ring seals 30, 32. When the second component 14 is screwed into the first component 12, the second O-ring seal 32 creates a sealing engagement with a portion of the first component 12 at a liquid outlet 34.

The post 22 forms a frame for mounting the cartridge onto the second component 14. More specifically, the post 22 extends through a center hole through the cartridge 10. After the cartridge 10 is mounted onto the post 22, the second component 14 is then screwed into the first component 12. The cartridge 10 is, thus, contained between the first and second components in the receiving area 16. However, in alternate embodiments any suitable cartridge mounting structure or shape could be provided. As seen with the flow arrows in FIG. 2, fluid can enter the receiving area 16 at inlets 36 in the first component 12, travel through the cartridge 10 in at least two paths A, B, enter the channel 24 in the post 22 through the side inlet slots 28 (filtered fluid from the two paths mixing proximate the entrance to the slots 28), and exit out the outlet 26 of the post 22 back to the engine. A seal 38 can also be provided to seal the top of the cartridge 10 with the cap section of the second component 14, and to push the cartridge down into the receiving area 16.

The cartridge 10 generally comprises a first filter element 40, a plate 42 at a first end of the first filter element 40, and an assembly 44 at an opposite second end of the first filter element. The first filter element 40 is preferably a pleated paper filter element in the general form of a tube. However, any suitable first filter element could be provided. The first filter element is configured to filter particles of a first size, such as larger than about 10-40 microns for example. The plate 42 seals off a bottom end of the first filter element 40 and has a center hole therethrough to accommodate the post 22. The plate 42 is connected to the first filter element 40 such as with adhesive or epoxy for example. The assembly 44 is connected to the opposite top end of the first filter element 40, such as with adhesive or epoxy for example.

Referring also to FIGS. 3-12, the assembly 44 generally comprises a connector plate 46, a top plate 48 and a second filter element 50. The plates 46, 48 form first and second frame members for the assembly 44. In a preferred embodiment the two plates 46, 48 are ultrasonically welded to each other. However, in alternate embodiments any suitable means could be used to connect the two plates to each other, such as adhesive for example. The second filter element 50 is captured between the two plates 46, 48 when the plates are connected to each other.

The connector plate 46 is preferably comprised of molded plastic. As seen best in FIGS. 6-8, the connector plate 46 has a center hole 52 to accommodate the post 22, a bottom side receiving area 54, a top side receiving area 56, and outlet holes 58. The top end of the first filter element 40 is received in the bottom side receiving area 54. The outlet holes 58 extend from the top side receiving area 56 to an area located inward from the bottom side receiving area 54. The top side receiving area 56 has an inner upwardly extending rim 60, an outer upwardly extending rim 62, and spacer ribs 64. The two rims 60, 62 are used to ultrasonically weld with the top plate 48, and also to mount the second filter element 50 on the connector plate 46. The spacer ribs 64 function to space the second filter element 50 slightly above the bottom of the receiving area 56 such that fluid exiting the bottom side of the second filter element 50 can flow to the outlet holes 58.

The second filter element 50 has a general flat disc shape with a center hole 66 to accommodate the post 22. The second filter element 50 is preferably comprised of a molded, or extruded, or formed porous plastic or polymer filter material. The second filter element is configured to filter particles of a second size which is smaller than the first size, such as about 4-5 microns or smaller for example.

Molded or formed porous plastic or polymer filter members have been used in the medical industry, such as Mupor™ porous PTFE sold by Porex Corporation of Fairburn, Ga. Mupor™ porous PTFE can have a pass size as small as 5 micron or less for example, and can have a thickness as small as only 2 mm or less for example. In alternate embodiments the thickness of the second filter element 50 could be any suitable thickness (more or less than 2 mm) and could comprise a varying thickness at different locations. Porex Corporation also manufactures porous plastic members made of other polymer materials, such as PE, PP, PDVF, EVA, NYLON 6, TPU, and SCP. The material could be TEFLON and perhaps cut after molding to open access to pores. The material could be sintered, such as a sintered plastic or polymer powder. Plastic materials can be formed by sintering for applications that require materials of specific porosity. Sintered plastic porous components are used in filtration and to control fluid and gas flows. Pressureless sintering is the sintering of a powder compact (sometimes at very high temperatures, depending on the powder) without applied pressure. This avoids density variations in the final component, which occurs with more traditional hot pressing methods. The powder compact can be created by slip casting into a plaster mould, then the final green compact can be machined or cut if necessary to a final shape before being heated to sinter. Rayon fibers could be used impregnated with phenolic resin for example, and situated between these layers could be a coalescing layer, such as borosilicate microglass for example. Any suitable polyamide could be used to form a porous plastic member. The second filter element 50 preferably has a pass size or pore size of about 4-5 microns. A filter element with a pore size of more or less than 4-5 microns could be used, such as 1-2 microns for example.

The top plate 48 is preferably comprised of molded plastic or polymer material. The top plate 48 has a center hole 68 to accommodate the post 22, a top side with a section 76 for mounting the seal 38, a bottom side with spacing rim projections 70, 72. The top plate 48 has inlet holes 74 from its top side to its bottom side. The spacing rim projections 70, 72 are configured to contact the top side of the second filter element 50. This forms a gap 78 (see FIG. 12) above the top side of the second filter element 50 for fluid to flow from the inlet holes 74 across the top side of the second filter element 50.

The components 46, 48, 50 are preferably pre-assembled into the assembly 44. The assembly 44 is then connected to the top end of the first filter element 40. As seen with reference to FIG. 2, the first fluid path A through the cartridge 10 can comprise the fluid passing from area 80, through the first filter element 40, into the center area 82 of the first filter element 40. The second fluid path B through the cartridge 10 can comprise the fluid passing from area 80, to area 84, through the assembly 44, and into area 82. The fluid from the two paths can mix in area 82 and enter the slots 28 of the post 22 to exit from the receiving area 16 (also mixing as it exits the post).

Figure 11:
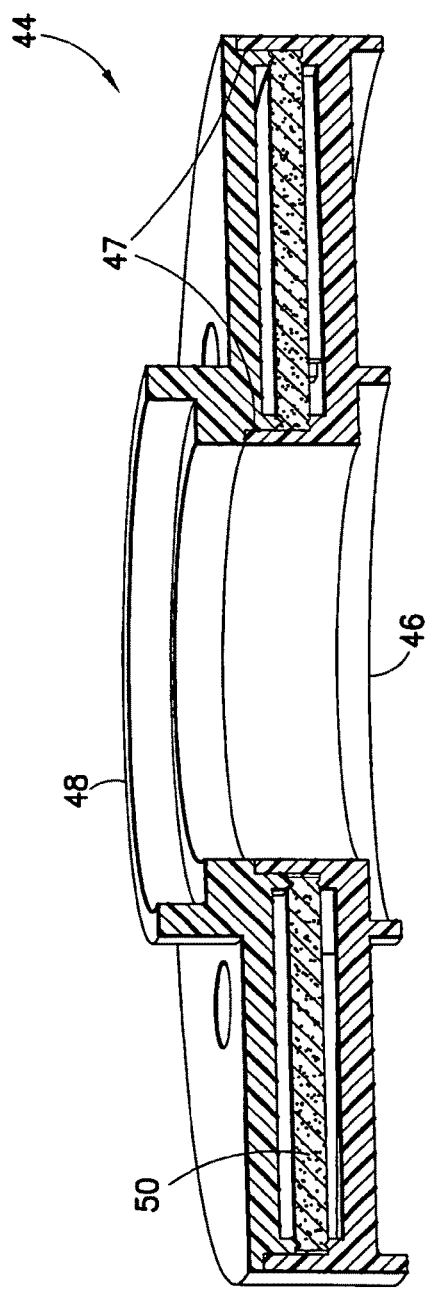
FIG. 11 is a cross sectional view of the assembly shown in FIG. 4.

As seen in FIG. 11, in this embodiment at least one of the two plates 46, 48 has energy director rings 47 (which can include melt ribs for example) for ultra sonic welding of the two plates. However, the plates 46, 48 could be sealingly connected to each other at 60, 62 by any suitable means including adhesive, epoxy or a mechanical connection such as screw threads for example. The energy director rings are located at the two ring shaped junctions of the plates 46, 48 to each other; at the outer perimeter and the inner hole. When the plates 46, 48 are connected to each other at these junctions, seals are formed at the junctions such that only holes 74 and 58 provide entry and exit to the area (including 78, 79) holding the second filter element 50.

Figure 12:
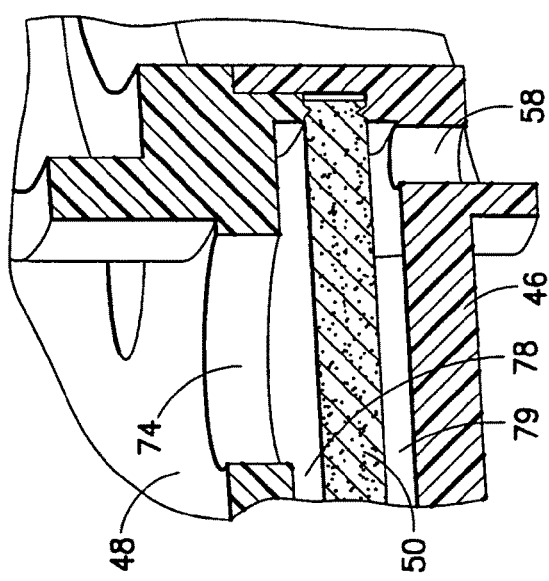
FIG. 12 is an enlarged view of a portion of the assembly shown in FIG. 11.
Figure 14:
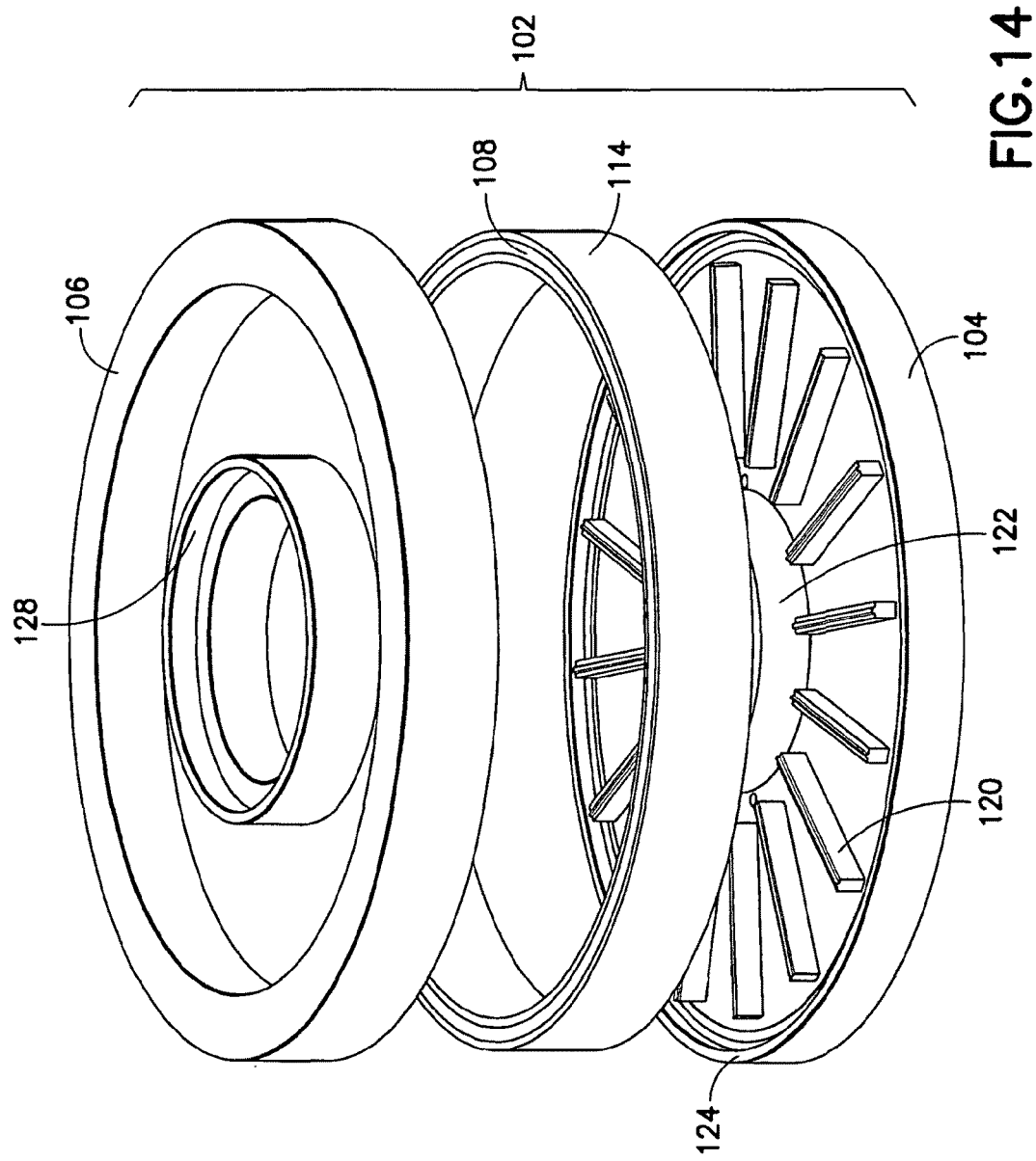
FIG. 14 is an exploded perspective view of the assembly at the top of the cartridge shown in FIG. 13.
Figure 15:
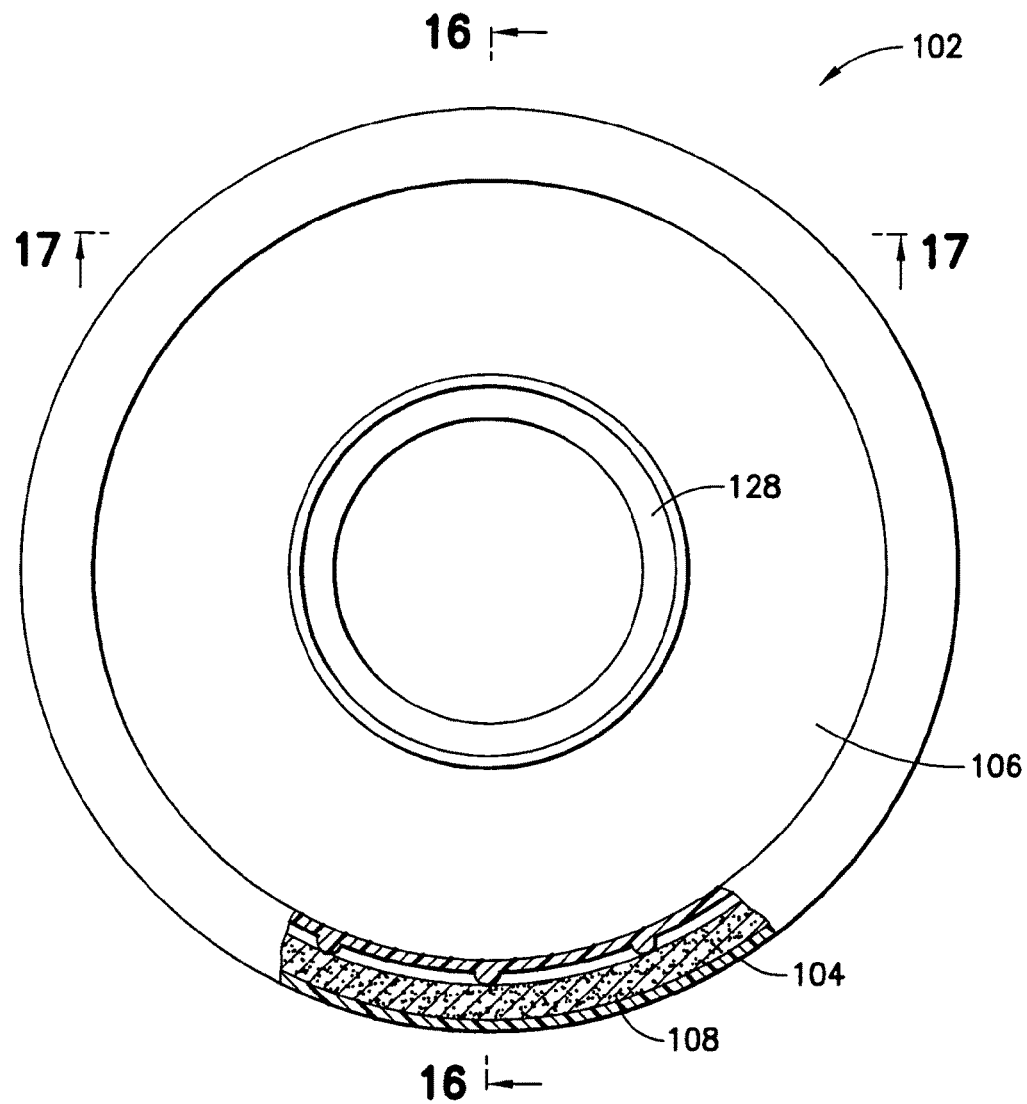
FIG. 15 is a plan top view with a cut away section of the assembly shown in FIG. 14.
Figure 17:
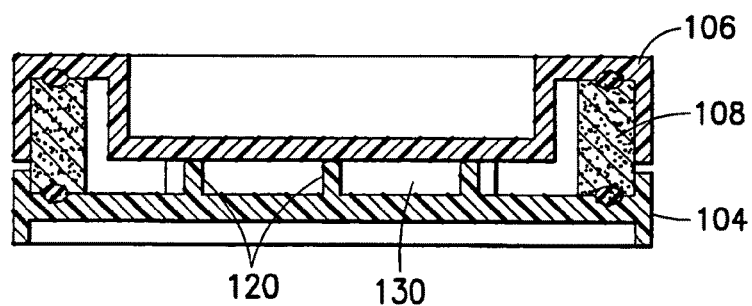
FIG. 17 is a cross sectional view of the assembly shown in FIG. 15 taken along line 17-17.
Figure 18:
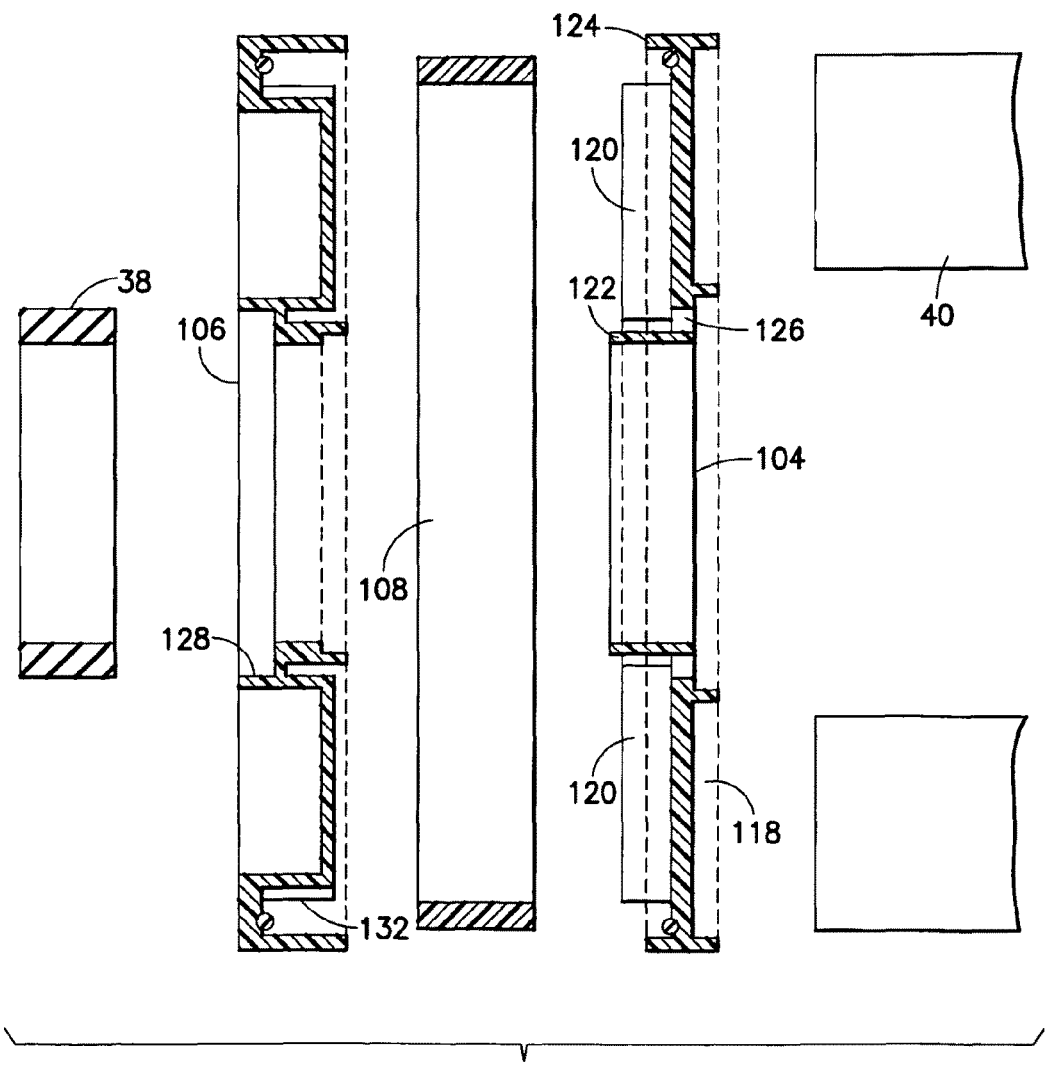
FIG. 18 is an exploded cross sectional view of the top of the cartridge shown in FIG. 13 an showing a seal ring.
Figure 19:
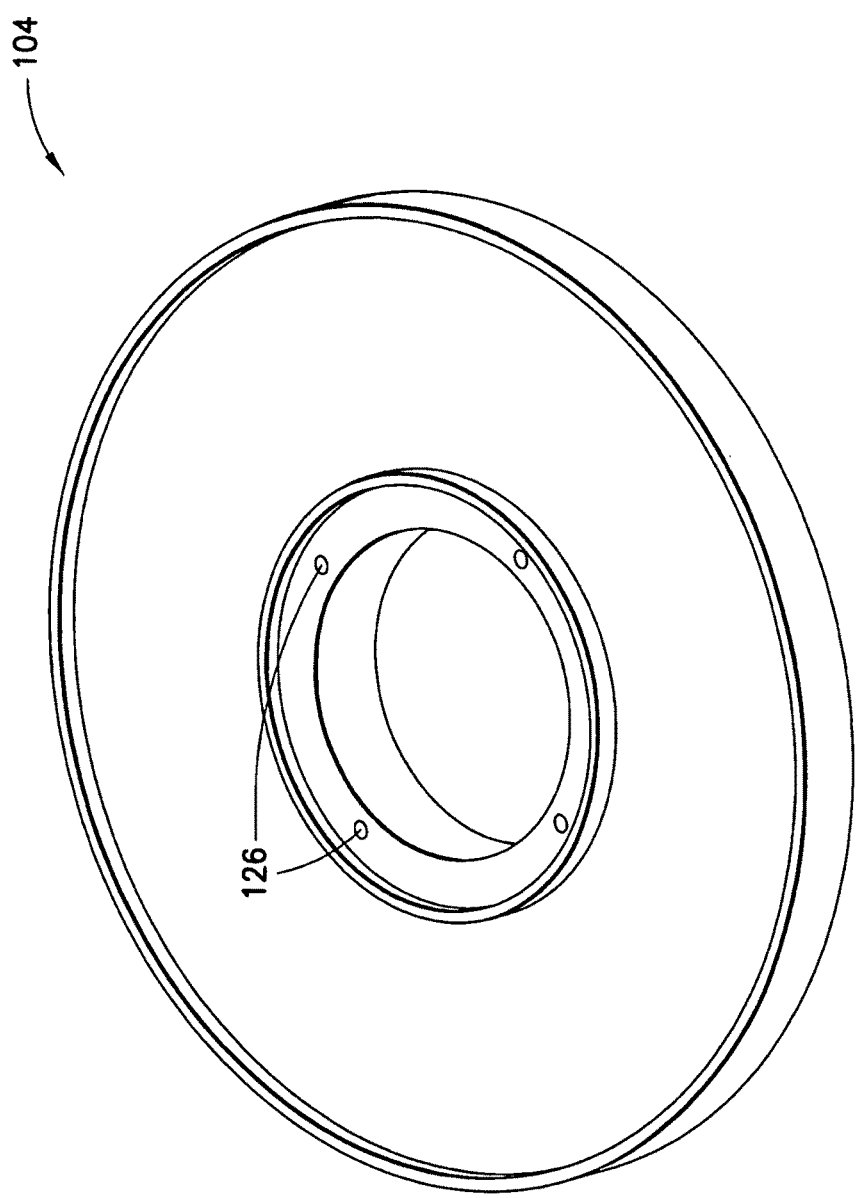
FIG. 19 is a perspective view of the bottom side of the bottom plate shown in FIG. 18.

With particular reference to FIG. 12, as the fluid passes through the assembly 44, it enters the inlet holes 74 into gap 78, passes through the second filter element 50, exits the second filter element 50 into the gap 79, and then exits the assembly 44 though the outlet holes 58 into area 82 inside the first filter element. In an alternate embodiment, the fluid could exit the assembly 44 though the outlet holes 58 into center channel of the post 22. Thus, the fluid flowing through the first path A is filtered down to a first particle size and the fluid flowing through the second path B is filtered down to a second particle size smaller than the first particle size. A feature of the invention is the use of this type of hybrid filter in a cartridge filter rather than a screw-on filter noted in the patents and patent publications identified above. The cartridge 10 could be used in currently existing engines without the need to modify the cartridge holding components (such as 12 and 14 for example) of the engine.

Referring now also to FIG. 13, another embodiment of the invention is shown. The cartridge 90 is intended to be inserted into the receiving area 16 for use with the components 12, 14 shown in FIG. 1 rather than the cartridge 10. The cartridge 100 comprises the first filter element 40, the plate 42 (see FIG. 1) and an assembly 102. The assembly 102 is used rather than the assembly 44. The assembly 102 is mounted to the top end of the first filter element 40, such as with adhesive or epoxy for example.

Referring also to FIGS. 14-19, the assembly 102 generally comprises a connector plate 104, a top plate 106 and a second filter element 108. The second filter element 108 is made from the same material as the second filter element 50 and/or could be made of other sintered material in different shore hardness's, but has a general ring shape rather than a disc shape. The second filter element 108 could be molded, extruded or otherwise comprises formed porous polymer material for example. The two plates 104, 106 are preferably connected to each other by ultra-sonic welding. However, any suitable connection system could be used; including a removable connector system. With the two plates 104, 106 connected to each other, the second filter element 108 is captured in the assembly. In this embodiment, O-ring seals 110 are provided at opposite ends of the second filter element 108 to seal with the plates. However, in alternate embodiments these might not be provided. The assembly 102 has a gap 112 formed between the two plates 104, 106 at the outer lateral perimeter side of the assembly 102. This gap 112 forms a fluid inlet into the assembly 102.

An outer lateral side 114 of the second filter element 108 proximate the gap 112 forms the inlet side of the second filter element 108. The opposite inner side 116 of the second filter element 108 forms the outlet side of the second filter element 108.

The connector plate 104 has a bottom side with a receiving area 118 which receives the top end of the first filter element 40. The top side of the connector plate 104 has spacer ribs 120 and inner and outer rims 122, 124. Outlet holes 126 are provided from the top side to the bottom side. The top ends of the inner rim 122 and the spacer ribs 120 can contact the top plate 106 and be ultra-sonically welded thereto. A gap is preferably provided between the outer side 114 and the plates 104, 106. The top plate 106 has lateral sections 132 (see FIG. 18) for contacting the inner side 116 of the second filter element 108. The top plate 106 has a section 128 for receiving the seal 38. All of the components 104, 106, 108 have a center open area to accommodate the post 22.

Fluid can flow laterally into the inlet 112 from the lateral side of the assembly 102, through the second filter element 108, into the gap 130 (see FIG. 17) and out the outlet holes 126 to an area located in the center open area of the first filter element 40.

With the invention an assembly can be provided comprising a first filter element 40; and a filter element assembly 44 connected to the first filter element, wherein the filter element assembly comprises a second filter element 50 located between a first plate 48 and a second plate 46, wherein the second plate comprises a liquid outlet 58 into a center open area 82 of the first filter element, wherein the first and second plates are directly fixedly connected to each other to retain the second filter element therebetween, and wherein the second plate is located at an end of the first filter element. The first and second plates can be comprised of a plastic or polymer material and are ultrasonically welded to each other. The first and second plates can comprise center holes with portions of the plates sealingly connected to each other at the center holes. The first and second plates can comprise outer perimeters which are sealingly connected to each other at the perimeters. The first plate can comprise liquid inlets therethrough. The first and second plates can be sealingly connected to each other to limit flow of a liquid from an inlet at the first plate, through the second filter element, to the outlet through the second plate. The inlet can be located at an outer lateral side of the first and second plates. The inlet can be located between outer perimeters of the first and second plates. The second plate can comprise a bottom side with a receiving area with the end of the first filter element being located in the receiving area. A top side of the second plate can comprise spacer ribs which the second filter element is located on. The second filter element can comprise a flat disk made of a porous polymer material having a pore side of about 5 microns or less. The second filter element can have a general ring shape with a center hole. The first and second plates can be sealingly connected to each other to limit flow of a liquid from an inlet at the first plate, through the second filter element, to the outlet through the second plate, wherein the inlet is located at an outer lateral side of the first and second plates, and wherein the second filter element has an exterior lateral side at the liquid inlet. The first filter element, the second filter element, the first plate and the second plate can each comprise center holes which are sized, shaped and located to receive a post of a mounting assembly therethrough to removably mount to the post.

With the invention an assembly 44 can be provided comprising a filter element 50 having a center hole; a frame comprising first and second frame members 46, 48 directly fixedly connected to each other with the filter element therebetween, wherein the second frame member has a liquid outlet 58, wherein the first and second frame members have center holes aligned with the center hole of the filter element, wherein the assembly is sized and shaped to be located against an end of a different first filter element 40 to substantially seal the end of the first filter element, and wherein the center holes are sized, shaped and located to receive a post 22 of a mounting assembly therethrough to removably mount to the post. The first and second frame members can be comprised of a plastic or polymer material and are ultrasonically welded to each other. The first and second frame members can comprise portions at the center holes which are sealingly connected to each other at the center holes. The first and second frame members can comprise outer perimeters which are sealingly connected to each other at the perimeters. The first frame member can comprises liquid inlets therethrough. The first and second frame members can be sealingly connected to each other to limit flow of a liquid from an inlet at the first plate, through the filter element, to the outlet through the second frame member. The inlet can be located at an outer lateral side of the first and second frame members. The inlet can be located between outer perimeters of the first and second frame members. The filter element can comprise a flat disk made of a porous polymer material having a pore side of about 5 microns or less.

With the invention a method can be provided comprising locating a filter element 50 between two frame members 46, 48, wherein the filter element 50 is a substantially solid disk made of a porous polymer material having a pore side of about 5 microns or less; and fixedly connecting the two frame members directly to each other to capture the filter element therebetween, wherein a second one of the frame members is sized and shaped to be connected to an end of a different first filter element. Fixedly connecting the two frame members directly to each other can comprise ultrasonically welding the two frame members to each other.

Figure 20:
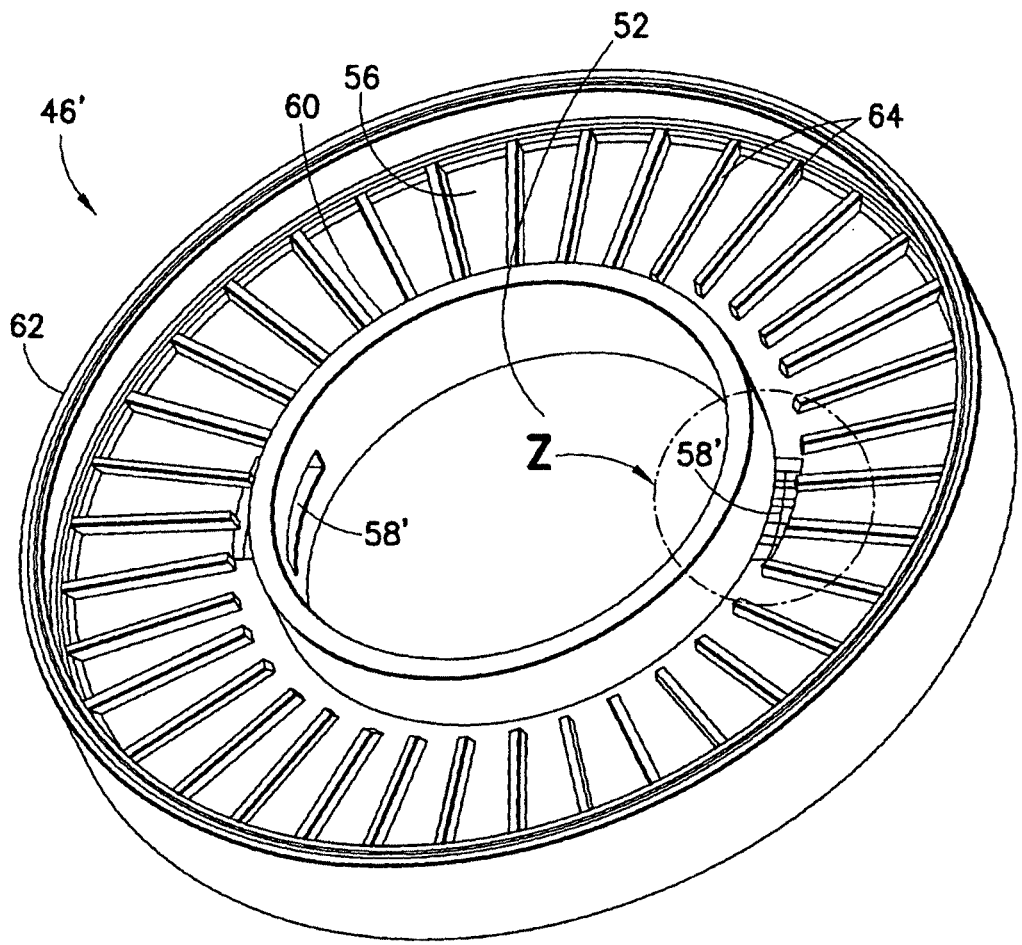
FIG. 20 is a perspective view of an alternate form of the connector plate shown in FIGS. 4-8.
Figure 21:
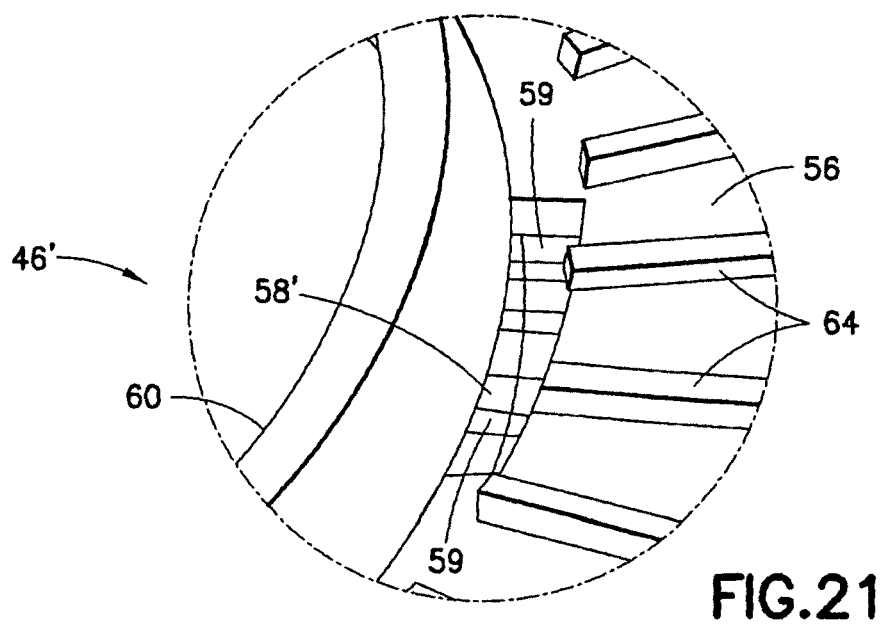
FIG. 21 is an enlarged view of the area Z shown in FIG. 20.
Figure 22:
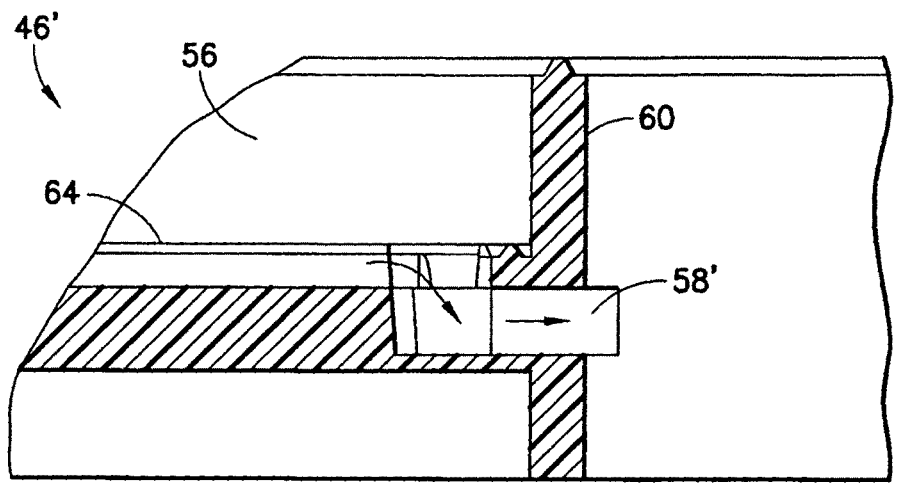
FIG. 22 is a partial cross sectional view of the connector plate shown in FIGS. 20-21.

FIG. 20 is a perspective view of a connector plate 46' which could be used in the assembly 44 shown in FIGS. 3-6 rather than the connector plate 46. Referring also to FIGS. 21-22, the connector plate 46' is identical to the connector plate 46 except that the plate 46' comprises holes 58' rather than holes 58. The holes 58' extend through the inner rim 60 between the inner hole 52 and the receiving area 56. This allows fluid to pass in the area below the tops of the spacer ribs 64 into the holes 58' and into the center hole 52. The fluid can then pass into the holes 28 of the post 22 (see FIG. 1). In this embodiment the holes 58' have ribs 59'. However, in alternate embodiments these ribs 59' might not be provided. This embodiment allows for a larger first filter element 40 because real estate does not need to be left open for the holes 58 of the first embodiment.

Figure 23:
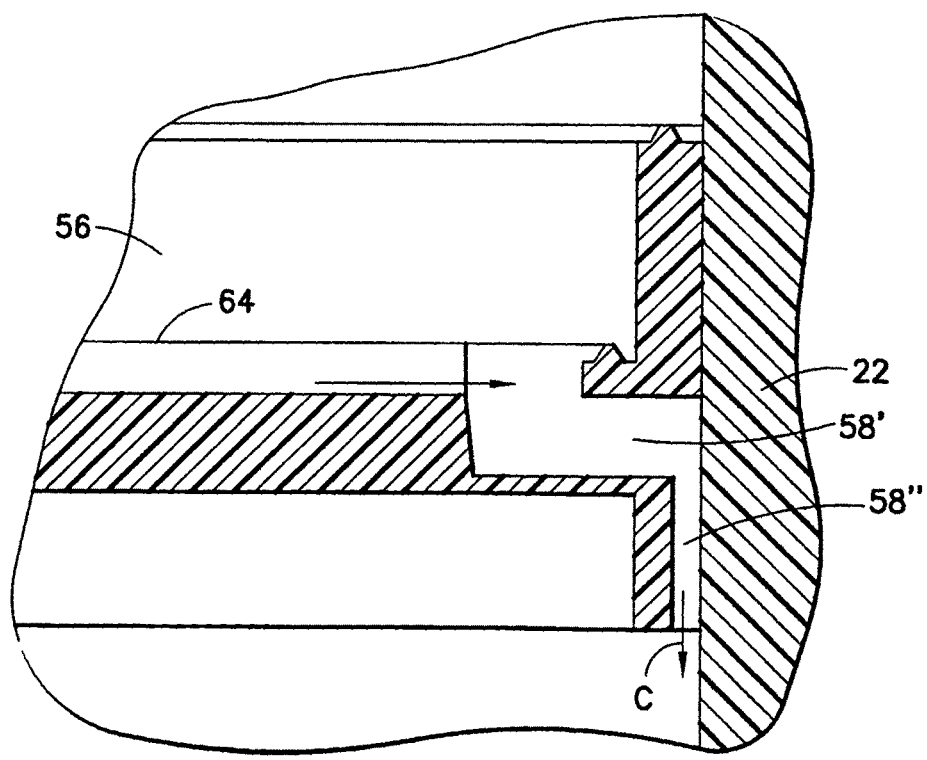
FIG. 23 is a view similar to FIG. 22 showing an alternate design.

Referring also to FIG. 23 another alternate embodiment is shown wherein a slot 58" is provided at the bottom inner side of the slot 58'. This allows the fluid from the second filter element 50 flowing out the hole 58' to have a larger area at its outlet, and/or outlet downward as shown by arrow C.

Figure 24:
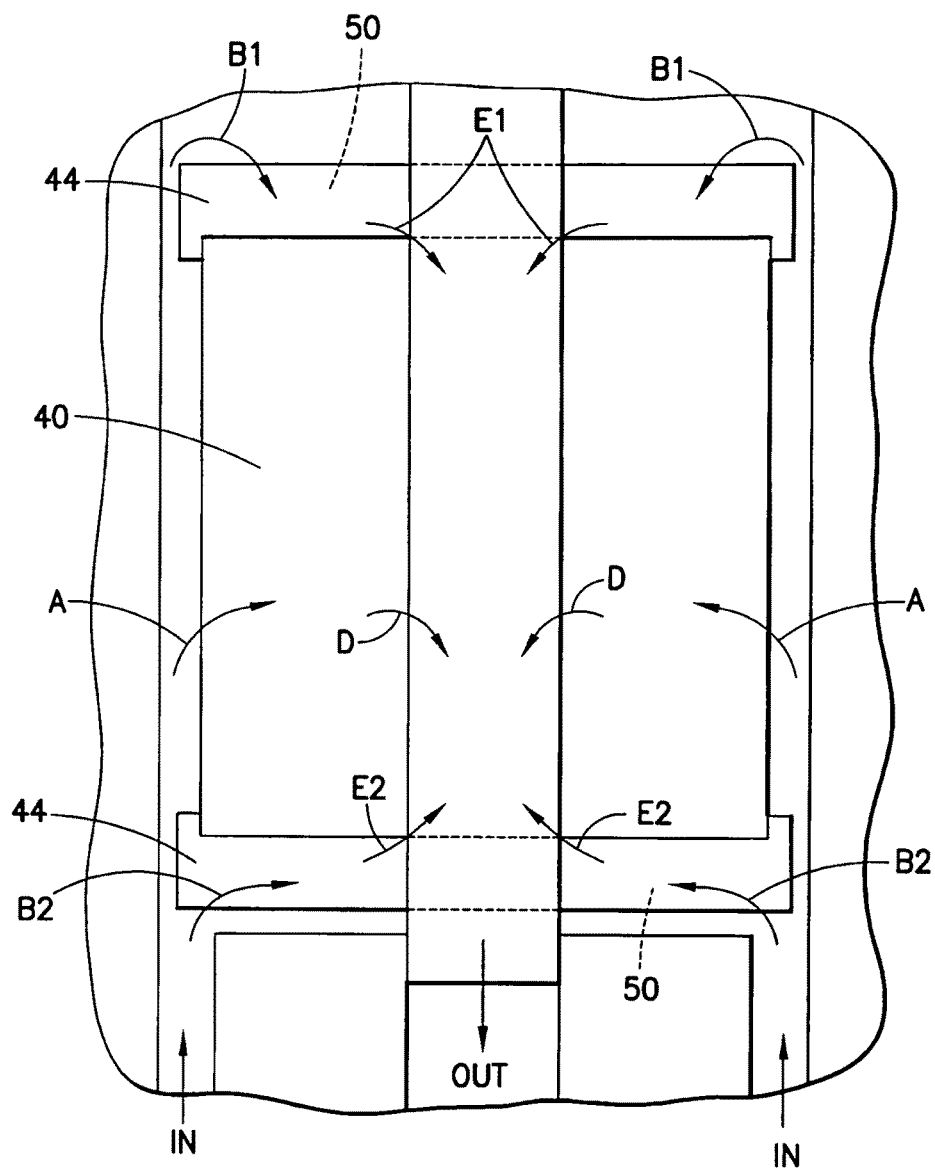
FIG. 24 is a diagram illustrating another alternate embodiment of the cartridge filter.

Referring also to FIG. 24, an alternate embodiment is shown where the cartridge 200 has a first filter element 40 and two assemblies 44; each with a separate second filter element 50, 50. The oil can flow:

into the cartridge receiving area as indicated by arrows IN,
 into the first filter element 40 as indicated by arrows A,
 into the two assemblies and two second filter elements 50 as indicated by arrow B1 and B2,
 out of the first filter element 40 as indicated by arrows D,
 out of the assemblies 44 and the two second filter elements 50 as indicated by arrows E1 and E2,
 mix in the inner chamber and exit the cartridge receiving area as indicated arrow OUT.

Thus, a cartridge could be provided having more than one fine filter element which are spaced from each other.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. An assembly comprising:
    a first filter element; and
    a filter element sub-assembly connected to the first filter element as a pre-assembled unitary assembly, wherein the filter element sub-assembly comprises a second filter element located between a first plate and a second plate, wherein the second plate comprises a liquid outlet into a center open area of the first filter element, where the second filter element comprises a rigid disk shaped member, where the second plate comprises spacer ribs to space the second filter element at a predetermined location on the second plate, wherein the first and second plates are directly fixedly connected to each other to retain the second filter element therebetween as the pre-assembled unitary assembly, and wherein the second plate is located at an end of the first filter element,
    wherein the first and second plates comprise center holes with portions of the plates sealingly connected to each other at the center holes.

2. An assembly as in claim 1 wherein the first and second plates are comprised of a plastic or polymer material and are ultrasonically welded to each other.

3. An assembly as in claim 1 wherein the first and second plates comprise outer perimeters which are sealingly connected to each other at the perimeters.

4. An assembly as in claim 1 wherein the first plate comprises liquid inlets therethrough.

5. An assembly as in claim 1 wherein the first and second plates are sealingly connected to each other to limit flow of a liquid from an inlet at the first plate, through the second filter element, to the outlet through the second plate.

6. An assembly as in claim 5 wherein the inlet is located at an outer lateral side of the first and second plates.

7. An assembly as in claim 1 wherein the second plate comprises a bottom side with a receiving area with the end of the first filter element being located in the receiving area.

8. An assembly as in claim 7 wherein a top side of the second plate comprises the spacer ribs which the second filter element is located on.

9. An assembly as in claim 1 wherein the second filter element comprises a flat disk made of a porous polymer material having a pore side of about 5 microns or less.

10. An assembly as in claim 1 wherein the second filter element has a general ring shape with a center hole.

11. An assembly as in claim 10 wherein the first and second plates are sealingly connected to each other to limit flow of a liquid from an inlet at the first plate, through the second filter element, to the outlet through the second plate, wherein the inlet is located at an outer lateral side of the first and second plates, and wherein the second filter element has an exterior lateral side at the liquid inlet.

12. An assembly as in claim 1 wherein the first filter element, the second filter element, the first plate and the second plate each comprise center holes which are sized, shaped and located to receive a post of a mounting assembly therethrough to removably mount to the post.

13. An assembly comprising:
a first filter element; and
a filter element sub-assembly connected to the first filter element as a pre-assembled unitary assembly, wherein the filter element sub-assembly comprises a second filter element located between a first plate and a second plate, wherein the second plate comprises a liquid outlet into a center open area of the first filter element, where the second filter element comprises a rigid disk shaped member, where the second plate comprises spacer ribs to space the second filter element at a predetermined location on the second plate, wherein the first and second plates are directly fixedly connected to each other to retain the second filter element therebetween as the pre-assembled unitary assembly, and wherein the second plate is located at an end of the first filter element,
wherein the first and second plates are sealingly connected to each other to limit flow of a liquid from an inlet at the first plate, through the second filter element, to the outlet through the second plate, wherein the inlet is located at an outer lateral side of the first and second plates, and wherein the inlet is located between outer perimeters of the first and second plates.

14. An assembly comprising:
a filter element having a center hole, where the filter element comprises a rigid ring shape;
a frame comprising first and second frame members directly fixedly connected to each other with the filter element therebetween as a pre-assembled unitary assembly, wherein the second frame member has a liquid outlet, wherein the first and second frame members have center holes aligned with the center hole of the filter element,
wherein the assembly is sized and shaped to be located against an end of a different filter element to substantially seal the end of the different filter element, and wherein the center holes are sized, shaped and located to receive a post of a mounting assembly therethrough to removably mount to the post, where the second frame member comprises spacer ribs to space the filter element at a predetermined location on the second frame member,
wherein the first and second frame members comprise portions at the center holes which are sealingly connected to each other at the center holes.

15. An assembly as in claim 14 wherein the first and second frame members are comprised of a plastic or polymer material and are ultrasonically welded to each other.

16. An assembly as in claim 14 wherein the first and second frame members comprise outer perimeters which are sealingly connected to each other at the perimeters.

17. An assembly as in claim 14 wherein the first frame member comprises liquid inlets therethrough.

18. An assembly as in claim 14 wherein the first and second frame members are sealingly connected to each other to limit flow of a liquid from an inlet at the first frame member, through the filter element, to the outlet through the second frame member.

19. An assembly as in claim 18 wherein the inlet is located at an outer lateral side of the first and second frame members.

20. An assembly as in claim 19 wherein the inlet is located between outer perimeters of the first and second frame members.

21. An assembly as in claim 14 wherein the filter element comprises a flat disk made of a porous polymer material having a pore side of about 5 microns or less.

22. A liquid filter comprising:
a different filter element; and
an assembly as in claim 14 connected to an end of the different filter element.

* * * * *